United States Patent
Kimura et al.

(10) Patent No.: US 9,113,519 B2
(45) Date of Patent: Aug. 18, 2015

(54) LED DRIVING APPARATUS AND LED LIGHTING APPARATUS

(75) Inventors: Kengo Kimura, Niiza (JP); Kazushige Hirata, Niiza (JP); Toshihiro Nakano, Niiza (JP)

(73) Assignee: Sanken Electric Co., Ltd., Niiza-shi (JP)

( * ) Notice: Subject to any disclaimer, the term of this patent is extended or adjusted under 35 U.S.C. 154(b) by 775 days.

(21) Appl. No.: 13/348,068

(22) Filed: Jan. 11, 2012

(65) Prior Publication Data

US 2012/0181941 A1 Jul. 19, 2012

(30) Foreign Application Priority Data

Jan. 18, 2011 (JP) .................................. 2011-007427
Nov. 1, 2011 (JP) .................................. 2011-239939

(51) Int. Cl.
H05B 37/00 (2006.01)
H05B 39/00 (2006.01)
H05B 41/14 (2006.01)
H05B 33/08 (2006.01)

(52) U.S. Cl.
CPC ........... *H05B 33/0815* (2013.01); *Y02B 20/348* (2013.01)

(58) Field of Classification Search
None
See application file for complete search history.

(56) References Cited

U.S. PATENT DOCUMENTS

| 7,750,616 | B2 | 7/2010 | Liu | |
|---|---|---|---|---|
| 7,999,487 | B2 * | 8/2011 | Szczeszynski | 315/291 |
| 8,044,609 | B2 * | 10/2011 | Liu | 315/291 |
| 8,698,849 | B2 * | 4/2014 | Woo et al. | 345/690 |
| 2008/0018261 | A1 * | 1/2008 | Kastner | 315/192 |
| 2011/0080118 | A1 * | 4/2011 | Daniel | 315/297 |

FOREIGN PATENT DOCUMENTS

| CN | 1463566 A | 12/2003 |
|---|---|---|
| CN | 101005722 A | 7/2007 |
| CN | 101252797 A | 8/2008 |

(Continued)

OTHER PUBLICATIONS

Combined Chinese Office Action and Search Report issued Dec. 10, 2013 in Patent Application No. 201210016851.6 (with English translation of categories of cited documents).

(Continued)

*Primary Examiner* — Anh Tran
(74) *Attorney, Agent, or Firm* — Oblon, McClelland, Maier & Neustadt, L.L.P.

(57) ABSTRACT

An LED driving apparatus converts AC input power into predetermined DC output power and supplies the DC output power to an LED load. The LED driving apparatus includes a switching element Q1 to be turned on and off, a ripple current reducer 3a that is connected in series with the LED load and reduces current ripples of the LED load, and a controller CNT that turns on and off the switching element according to a feedback voltage taken from a connection point of the LED load and ripple current reducer, thereby controlling the DC output power to a predetermined value.

8 Claims, 6 Drawing Sheets

(56) References Cited

FOREIGN PATENT DOCUMENTS

| | | |
|---|---|---|
| CN | 101674693 A | 3/2010 |
| JP | 2001-313423 | 11/2001 |
| JP | 2004-527138 | 9/2004 |
| JP | 2004-327152 | 11/2004 |
| JP | 2007-194478 | 8/2007 |
| JP | 2009-290183 A | 12/2009 |
| JP | 2010-177059 A | 8/2010 |
| JP | 2010-187429 A | 8/2010 |
| JP | 2011-103285 A | 5/2011 |
| TW | 200950589 A | 12/2009 |
| TW | 201028032 A1 | 7/2010 |
| TW | 201034502 A1 | 9/2010 |

OTHER PUBLICATIONS

Combined Chinese Office Action and Search Report issued Apr. 17, 2014 in Patent Application No. 201210016851.6 (with English translation of categories of cited documents).
Office Action issued Dec. 26, 2012 in Korean Patent Application No. 10-2011-0142039.
Combined Taiwanese Office Action and Search Report issued Mar. 25, 2014 in Patent Application No. 101101906 (with English translation of categories of cited documents).
Japanese Office Action issued Mar. 27, 2012 in patent application No. 2011-239939 with partial English Outline of Office Action.
Japanese Office Action issued Oct. 1, 2013 in Patent Application No. 2012-182968.

* cited by examiner

LED DRIVING APPARATUS AND LED LIGHTING APPARATUS

BACKGROUND OF THE INVENTION

1. Field of the Invention

The present invention relates to an LED driving apparatus and an LED lighting apparatus employing the LED driving apparatus.

2. Description of Related Art

LED (light emission diode) elements are used for backlights of liquid crystal displays and light sources of lighting devices such as streetlights. Incandescent bulbs and fluorescent lamps are being replaced with bulb-type LED lighting apparatuses and fluorescent-lamp-type LED lighting apparatuses using white LED elements. These LED lighting apparatuses need LED driving apparatuses that are capable of correctly supplying electric power to the LED elements.

FIG. 1 is a circuit diagram illustrating an LED lighting apparatus 110 having an LED driving apparatus 101 according to a related art. The LED driving apparatus 101 includes a rectifier DB100, a transformer TR100, a switching element MOSFET Q101, a rectifying-smoothing circuit including a diode D101 and a capacitor C101, a controller CNT 100, and a capacitor C103. The LED driving apparatus 101 and an LED load 102 including LED elements LED1 to LEDn are the LED lighting apparatus 110.

The rectifier DB100 is a known diode bridge and is connected to an AC input power source AC100. The transformer TR100 includes a primary winding W101, a secondary winding W102, and a tertiary winding W103. A first end of the primary winding W101 is connected to the rectifier DB100 and a second end thereof is connected to a drain of the MOSFET Q101. Both ends of the secondary winding W102 are connected to the rectifying-smoothing circuit. Both ends of the tertiary winding W103 are connected to an auxiliary power source that includes a diode D102 and a capacitor C102.

A source of the MOSFET Q101 is grounded and a gate thereof is connected to the controller CNT 100. Both ends of the rectifying-smoothing circuit are connected to a series circuit that includes the LED load 102 and a detective resistor Rs100. The LED load 102 includes the n pieces of LED elements LED1 to LEDn that are connected in series. Here, the number of "n" is a natural number equal to or greater than 1.

The controller CNT100 has terminals that are connected to the gate of the MOSFET Q101, the auxiliary power source, a connection point of the LED load 102 and detective resistor Rs100, and the capacitor C103, respectively. The controller CNT 100 also has a terminal that is connected through a resistor R101 to a connection point of the rectifier DB100 and the primary winding W101 of the transformer TR100. The controller CNT100 includes an error amplifier AMP101 and a comparator CMP100.

An inverting input terminal (−) of the error amplifier AMP101 is connected to the connection point of the LED load 102 and detective resistor Rs100 and a non-inverting input terminal (+) thereof is connected to a reference voltage that includes a constant voltage source REG and a zener diode ZD101. An output terminal of the error amplifier AMP101 is connected through an integrator that includes a resistor R103 and the capacitor C103 to a first non-inverting input terminal of the comparator CMP100. The error amplifier AMP101 provides the comparator CMP100 with an error signal based on a current passing through the LED load 102 and a reference value.

An inverting input terminal of the comparator CMP100 is connected to a triangular wave generator and a second non-inverting input terminal thereof is connected to a duty limiter that includes the constant voltage source REG and resistors R104 and R105. An output terminal of the comparator CMP100 is connected through a driver to the gate of the MOSFET Q101. The comparator CMP100 provides the driver with a PWM signal based on the error signal from the error amplifier AMP101 and a triangular wave from the triangular wave generator.

In the LED driving apparatus 101, the controller CNT100 controls ON/OFF of the MOSFET Q101 in such a way as to equalize a current passing through the LED load 102 with a reference value (reference voltage), thereby adjusting a voltage applied to the LED load 102.

The related LED driving apparatus is disclosed in Japanese Unexamined Patent Application Publication No. 2004-527138 (Patent Document 1).

SUMMARY OF THE INVENTION

FIG. 2 is a waveform diagram illustrating voltages and currents at different parts in the LED driving apparatus 101 and LED lighting apparatus 110 according to the related art illustrated in FIG. 1. The LED driving apparatus 101 converts AC input power into DC power and supplies the DC power to the LED load 102. Accordingly, ripples contained in an input voltage Vin100 easily affect an output voltage Vout100, i.e., a voltage across the capacitor C101, and therefore, the output voltage Vout100 involves very small voltage variations. An LED element has a tendency to exponentially increase a forward current (If) as a function of a forward voltage (Vf). Namely, even a very small voltage variation causes a large change in an LED current ILED100 (forward current) passing to the LED load 102. The LED driving apparatus 101 of the related art, therefore, has a problem of easily causing large variations in the LED current ILED100, to destabilize light emission of the LED load 102. Such current variations may be reduced by increasing capacitance of the capacitor C101. This, however, requires a large-sized electrolytic capacitor, to increase the size of the LED lighting apparatus 110.

FIG. 3 is a circuit diagram illustrating an LED lighting apparatus with an LED driving apparatus according to another related art. The LED driving apparatus of FIG. 3 employs two converters, i.e., a power factor corrector and a power converter connected to the power factor corrector.

The power factor corrector corrects a power factor and includes a transformer TR100, a switching element MOSFET Q101, a rectifying-smoothing circuit that includes a diode D101 and a capacitor C101, a controller CNT100, and resistors R107 and R108. The power converter includes a transformer TR200, a switching element MOSFET Q201, a rectifying-smoothing circuit that includes a diode D201 and a capacitor C201, and a controller CNT200.

The LED driving apparatus of FIG. 3 employs the power factor corrector in addition to the power converter, and therefore, is capable of carrying out highly efficient power conversion. In addition, it can reduce ripples in an AC input voltage through two stages including the power factor corrector that provides an output voltage Vout1 and the power converter that provides an output voltage Vout2, thereby minimizing current ripples to be passed through an LED load 102.

The related art of FIG. 3, however, must have the two converters, to deteriorate an overall efficiency and increase the size and cost of the apparatus.

Patent Document 1 describes an LED driving apparatus that includes an AC/DC converter connected to an AC input power source, a DC/DC converter to convert DC output power from the AC/DC converter into required DC power to be supplied to LED elements (LED load), and a current feedback unit to adjust a current passing through the LED elements.

This LED driving apparatus is capable of reducing variations in a current passed to the LED load and stabilizing light emission of the LED load. This LED driving apparatus, however, must have the two converters, i.e., the AC/DC converter and DC/DC converter, to increase the size and cost of the apparatus and deteriorate the power conversion efficiency of the apparatus.

The present invention provides an LED driving apparatus that is compact and capable of stabilizing light emission of an LED load and an LED lighting apparatus employing the LED driving apparatus.

According to an aspect of the present invention, the LED driving apparatus converts AC input power into predetermined DC output power and supplies the DC output power to an LED load. The LED driving apparatus includes a switching element to be turned on and off, a ripple current reducer that is connected in series with the LED load and reduces current ripples of the LED load, and a controller that turns on and off the switching element according to a feedback voltage at a connection point of the LED load and ripple current reducer, thereby controlling the DC output power to the predetermined value.

DESCRIPTION OF PREFERRED EMBODIMENTS

LED lighting apparatuses with LED driving apparatuses according to embodiments of the present invention will be explained in detail with reference to the drawings.

First Embodiment

Figure 4:
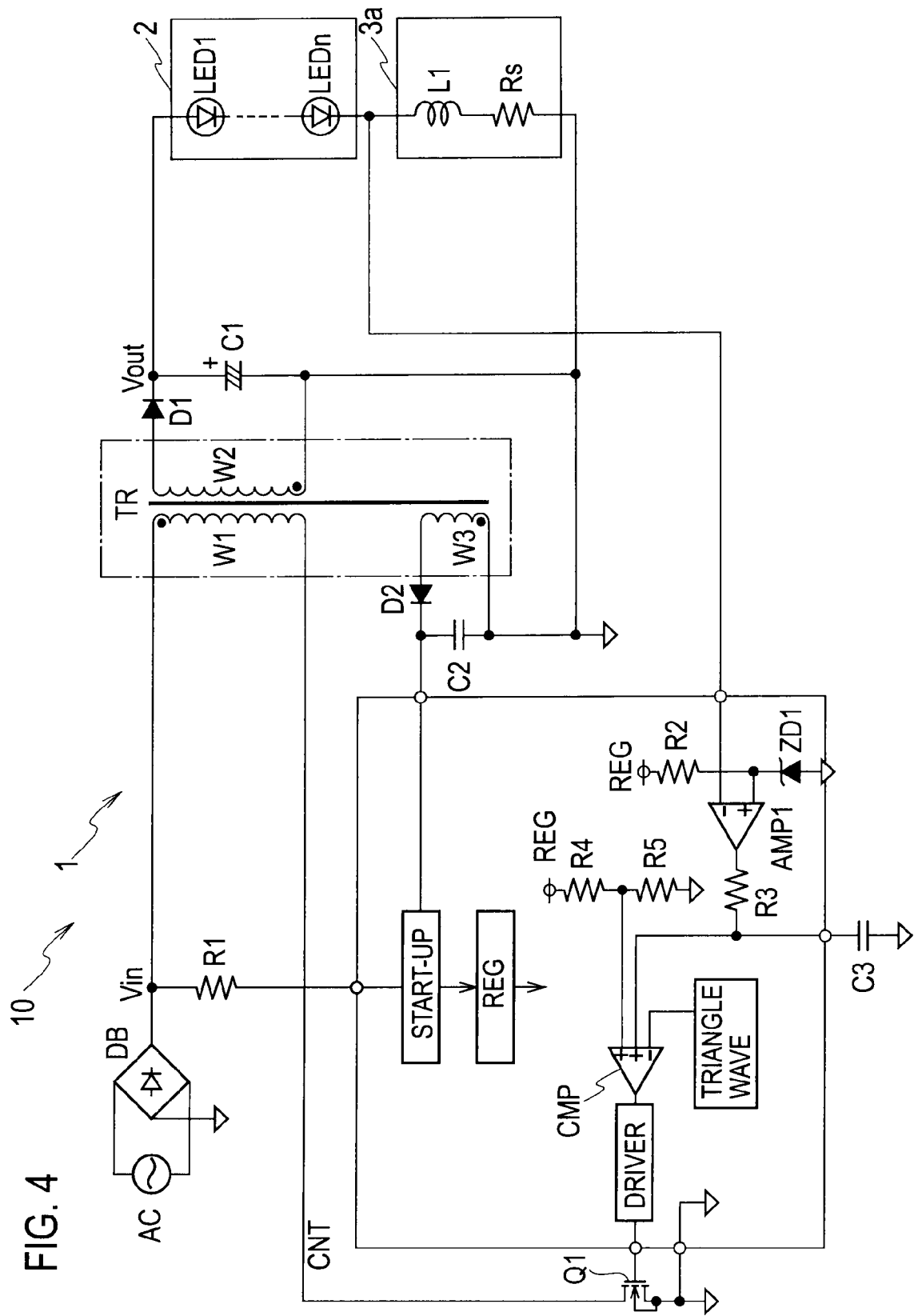
FIG. 4 is a circuit diagram illustrating an LED lighting apparatus with an LED driving apparatus according to a first embodiment of the present invention.

FIG. 4 is a circuit diagram illustrating an LED lighting apparatus 10 with an LED driving apparatus 1 according to the first embodiment of the present invention. The LED driving apparatus 1 includes a rectifier DB, a transformer TR, a first MOSFET (switching element) Q1, a rectifying-smoothing circuit including a diode D1 and a capacitor C1, a controller CNT, a capacitor C3, and a ripple current reducer 3a. The LED driving apparatus 1 and an LED load 2 having LED elements LED1 to LEDn form the LED lighting apparatus 10.

The rectifier DB is a known diode bridge and is connected to an AC input power source AC, to rectify AC input power into a pulsating current of one direction and supply the current to the transformer TR. The AC input power source AC and rectifier DB may be replaced with a DC power source such as a battery.

The transformer TR has a primary winding W1, a secondary winding W2, and a tertiary winding W3. A first end of the primary winding W1 is connected to the rectifier DB and a second end thereof is connected to a drain of the first MOSFET Q1. Connected between both ends of the secondary winding W2 is the rectifying-smoothing circuit including the diode D1 and capacitor C1. Connected between both ends of the tertiary winding W3 is an auxiliary power source including a diode D2 and a capacitor C2.

A source of the first MOSFET Q1 is grounded and a gate thereof is connected to the controller CNT.

Both ends of the rectifying-smoothing circuit that includes the diode D1 and capacitor C1 are connected to a series circuit that includes the LED load 2 having the n-pieces of LED elements LED1 to LEDn connected in series and the ripple current reducer 3a. Here, the number n is a natural number equal to or greater than 1. A cathode of the diode D1 and a first end of the capacitor C1 are connected to an anode of the LED element LED1 of the LED load 2. A second end of the capacitor C1 is grounded. The ripple current reducer 3a includes a reactor L1 and a current detective resistor Rs that are connected in series.

The controller CNT has terminals that are connected to the gate of the first MOSFET Q1, the auxiliary power source, a connection point of the LED load 2 and ripple current reducer 3a, and the capacitor C3, respectively. The controller CNT also has a terminal connected through a resistor R1 to a connection point of the rectifier DB and primary winding W1 of the transformer TR. The controller CNT includes a first error amplifier AMP1 and a comparator CMP.

An inverting input terminal of the first error amplifier AMP1 is connected to a connection point of the LED load 2 and ripple current reducer 3a and a non-inverting input terminal thereof is connected to a first reference voltage that includes a constant voltage source REG and a zener diode ZD1. An output terminal of the first error amplifier AMP1 is connected through an integration circuit including a resistor R3 and the capacitor C3 to a first non-inverting input terminal of the comparator CMP. The first error amplifier AMP1 generates a first error signal according to a current ILED passing to the LED load 2 and the first reference value (first reference voltage) and outputs the first error signal through the integration circuit to the comparator CMP.

An inverting input terminal of the comparator CMP is connected to a known triangular wave generator and a second non-inverting input terminal thereof is connected to a duty limiter that includes the constant voltage source REG and resistors R4 and R5. An output terminal of the comparator CMP is connected through a driver to the gate of the first MOSFET Q1. The comparator CMP selects a lower one of the first error signal from the first error amplifier AMP1 and an output signal from the duty limiter, and according to the lower one and a triangular wave from the triangular wave generator, generates a PWM (pulse width modulation) signal. The PWM signal is supplied to the driver. The comparator CMP operates in such a way as to increase the ON duty (ON time) of the PWM signal if the LED current ILED is lower than the first reference value and decrease the same if the LED current ILED is higher than the first reference value. The duty limiter limits a maximum value of the ON duty of the PWM signal when the first error signal becomes excessively high.

The first error signal is integrated by the integration circuit and is supplied to the first non-inverting input terminal of the comparator CMP. Accordingly, based on a time constant determined by the resistor R3 and capacitor C3, a response speed (response frequency) of the controller CNT is delayed from a change in the LED current ILED. The first embodiment sets the relaxation time constant determined by the resistor R3 and capacitor C3 so that the first error signal is integrated for a period longer than one period of the AC input power source AC. In this case, the ON duty of the PWM signal is unchanged for one period of the AC input power source AC, to improve a power factor of the LED driving apparatus 1.

Figure 5:
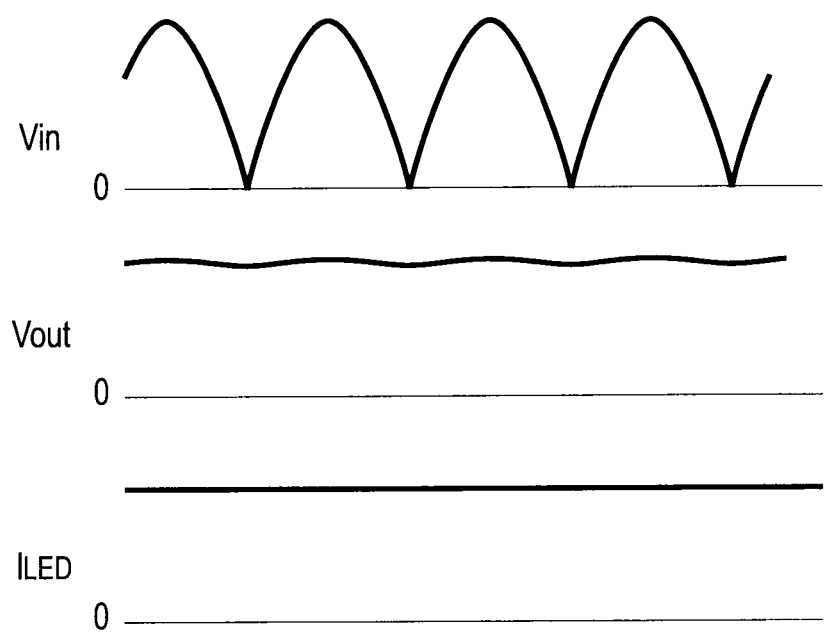
FIG. 5 is a waveform diagram illustrating voltages and currents at different parts in the apparatus of FIG. 4.

FIG. 5 is a waveform diagram illustrating voltages and currents at different parts in the LED lighting apparatus 10 with the LED driving apparatus 1 according to the present embodiment. In the LED driving apparatus 1, the controller CNT controls ON/OFF of the first MOSFET Q1 in such a way as to equalize the current ILED passing through the LED load 2 with the first reference value (first reference voltage). Like the LED driving apparatuses of the related arts, the LED driving apparatus 1 according to the present embodiment converts AC input power into DC power and supplies the DC power to the LED load 2. Accordingly, an output voltage Vout, i.e., a voltage across the capacitor C1 of the present embodiment involves very small voltage variations like that of the related art.

According to the first embodiment, the output voltage variations cause both ends of the reactor L1 of the ripple current reducer 3a to generate voltages, thereby reducing voltage ripples at both ends of the LED load 2 and minimizing output current ripples.

Figure 1:
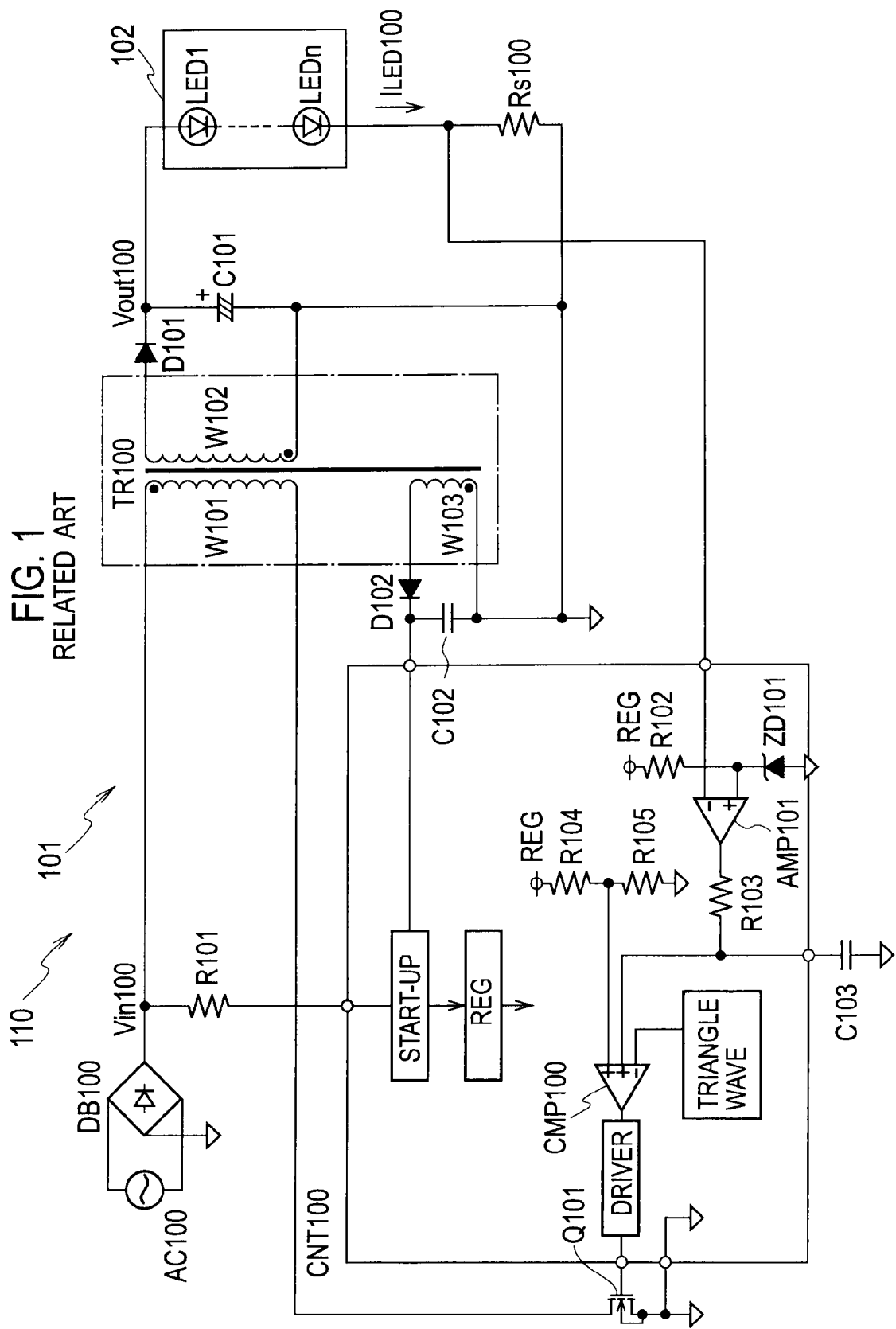
FIG. 1 is a circuit diagram illustrating an LED lighting apparatus with an LED driving apparatus according to a related art.
Figure 2:
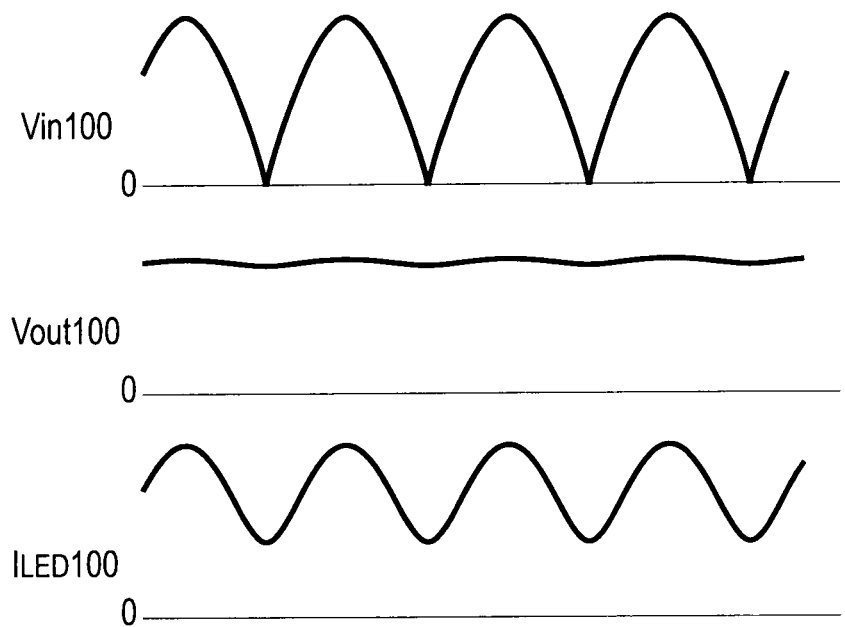
FIG. 2 is a wave form diagram illustrating voltages and currents at different parts in the apparatus of FIG. 1.
Figure 3:
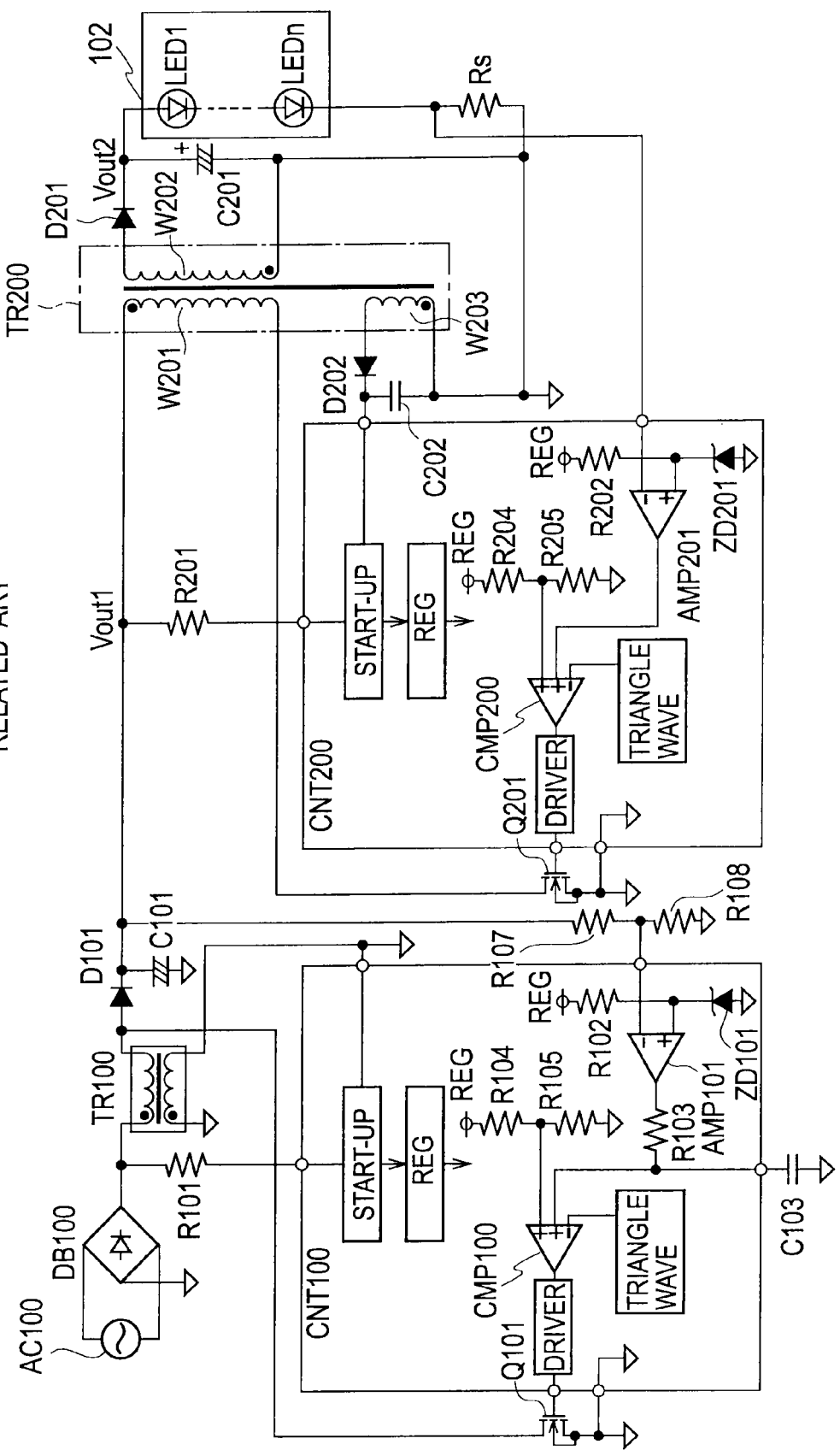
FIG. 3 is a circuit diagram illustrating an LED lighting apparatus with an LED driving apparatus according to another related art.

As a result, the LED current ILED according to the first embodiment involves substantially no current ripples as illustrated in FIG. 5, unlike the LED current ILED100 of the related art that involves large current ripples as illustrated in FIG. 2.

The first embodiment takes a feedback signal from the connection point of the LED load 2 and reactor L1 when controlling power conversion. This minimizes influences of variations in the forward voltage VF of the LED load 2 and temperature characteristics. Namely, there is no need for the LED driving apparatus 1 of the first embodiment to consider variations in the forward voltage VF and temperature characteristics.

Second Embodiment

Figure 6:
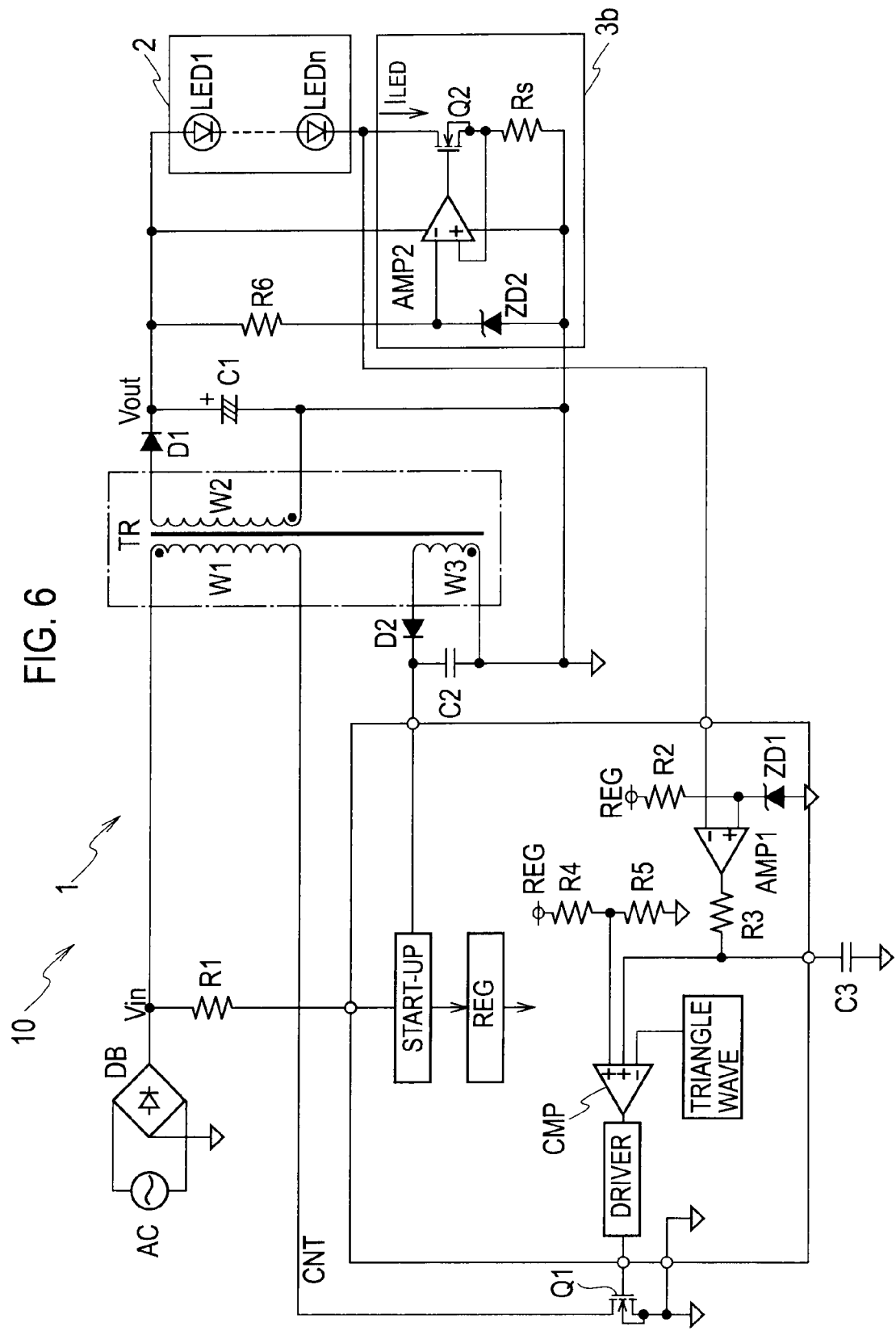
FIG. 6 is a circuit diagram illustrating an LED lighting apparatus with an LED driving apparatus according to a second embodiment of the present invention.

FIG. 6 is a circuit diagram illustrating an LED lighting apparatus 10 with an LED driving apparatus 1 according to the second embodiment of the present invention. The second embodiment of FIG. 6 differs from the first embodiment of FIG. 4 in the configuration of the ripple current reducer.

In FIG. 6, the ripple current reducer 3b according to the present embodiment is connected to a rectifying-smoothing circuit including a diode D1 and a capacitor C1, an LED load 2, and a controller CNT. The ripple current reducer 3b is a voltage-controlled current source and corresponds to the feedback-controlled constant current source as stipulated in the claims. The ripple current reducer 3b includes a second MOSFET (variable impedance element) Q2, a detective resistor (current detector) Rs, a second error amplifier AMP2, and a zener diode ZD2. A drain of the second MOSFET Q2 is connected to a cathode of an LED element LEDn of the LED load 2, a source thereof is connected through the detective resistor Rs to the ground, and a gate thereof is connected to an output terminal of the second error amplifier AMP2. The second MOSFET Q2 continuously changes a drain-source resistance value according to an output from the second error amplifier AMP2. Accordingly, the second MOSFET Q2 is replaceable with a known impedance element whose resistance value changes in response to an electric signal. The response speed of the ripple current reducer 3b is set to be higher than the response speed of the controller CNT, and preferably, higher than the frequency of an AC input power source AC.

A connection point of the detective resistor Rs and the source of the second MOSFET Q2 is connected to a non-inverting input terminal (+) of the second error amplifier AMP2. The detective resistor Rs converts a current ILED passing through the LED load 2 into a voltage signal and outputs the voltage signal to the second error amplifier AMP2. The detective resistor Rs may be replaced with any other current detector such as a current transformer, or any other configuration that is capable of representing the LED current ILED with an electric signal other than the voltage signal.

A cathode of the zener diode ZD2 is connected through a resistor R6 to a connection point of the diode D1 and capacitor C1, as well as to an inverting input terminal (−) of the second error amplifier AMP2. An anode of the zener diode ZD2 is grounded.

The non-inverting input terminal (+) of the second error amplifier AMP2 is connected to a second reference voltage that includes the zener diode ZD2. The output terminal of the second error amplifier AMP2 is connected to the gate of the second MOSFET Q2. The second error amplifier AMP2 generates a second error signal according to the current ILED passing through the LED load 2 and the second reference value (second reference voltage) and outputs the second error signal to the second MOSFET Q2. The voltage level of the second error signal of the second error amplifier AMP2 increases as the LED current ILED decreases lower than the second reference value, thereby lowering the source-drain resistance value of the second MOSFET Q2. As the LED current ILED increases higher than the second reference value, the voltage level of the second error signal of the second error amplifier AMP2 decreases, thereby increasing the source-drain resistance value of the second MOSFET Q2. As a result, the potential of the detective resistor Rs is maintained to be always equal to the potential of the zener diode ZD2. Namely, a voltage across the detective resistor Rs is kept constant according to a zener voltage, to provide a constant current source function that maintains the load current ILED constant.

In the LED driving apparatus 1 according to the present embodiment, the controller CNT controls ON/OFF of a first MOSFET Q1 in such a way as to equalize the current ILED passing through the LED load 2 with a first reference value (first reference voltage). Like the LED driving apparatus of the related art, the LED driving apparatus 1 of the second embodiment converts AC input power into DC power and supplies the DC power to the LED load 2. Accordingly, an output voltage Vout, i.e., a voltage across the capacitor C1 involves very small voltage variations like that of the related art.

At this time, the ripple current reducer 3b according to the second embodiment controls the second MOSFET Q2 in such a way as to equalize the second error signal based on the LED current ILED with the second reference value (second reference voltage). As a result, the LED current ILED according to the second embodiment involves substantially no current ripples, unlike the LED current ILED100 of the related art that involves large current ripples as illustrated in FIG. 2.

In summary, the LED driving apparatus according to any one of the embodiments of the present invention provides effects mentioned below.

(1) The ripple current reducer 3b needs no power factor correcting operation, and therefore, the response speed (response frequency) of the ripple current reducer 3b can be set faster than that of the controller CNT, to minimize current ripples in the LED current ILED passing to the LED load 2.

(2) The LED driving apparatus takes a feedback signal from the connection point of the LED load 2 and reactor L1, to minimize the influences of variations in the forward voltage VF of the LED load 2 and temperature characteristics. Accordingly, there is no need for the LED driving apparatus to consider variations in the forward voltage VF and temperature characteristics.

(3) The LED driving apparatus minimizes ripples in the current ILED passing through the LED load 2, thereby stabilizing light emission of the LED load 2.

(4) The LED driving apparatus stabilizes light emission of the LED load 2 without using electrolytic capacitors or AC/DC converters, and therefore, is simple, compact, and low cost.

(5) The LED driving apparatus minimizes variations in the LED current ILED of the LED load 2, thereby reducing noise to be emitted from the LED lighting apparatus having the LED driving apparatus.

(6) Minimizing variations in the LED current ILED results in suppressing a large peak current of the LED elements LED1 to LEDn of the LED load 2. This reduces electric stress applied to the LED elements LED1 to LEDn and extends the service life of the LED load 2.

(7) Voltage ripples occurring in the output voltage Vout are very small, and therefore, power consumption of the second MOSFET Q2 and detective resistor Rs is small. This improves efficiency of the LED driving apparatus.

The configurations, shapes, dimensions, and arrangements of the embodiments described herein are somewhat schematic to make the present invention clearly understandable and executable. The present invention is not limited to the embodiments and the embodiments are modifiable in various ways without departing from the scope of the claims.

For example, although the LED driving apparatus of each embodiment employs a transformer, the apparatus according to the present invention is not limited to whether or not it employs transformers, or whether it employs an insulated configuration or a non-insulated configuration.

The response speed of the controller CNT of each embodiment is limited by the integration circuit. This does not limit the present invention. The response speed of the controller CNT may be limited by a component contained in the controller CNT. The first and second reference values may be variable according to external signals.

In this way, the LED driving apparatus according to the present invention is capable of stabilizing light emission of an LED load and is manufacturable in a compact form.

This application claims benefit of priority under 35USC §119 to Japanese Patent Applications No. 2011-7427, filed on Jan. 18, 2011 and No. 2011-239939, filed on Nov. 1, 2011, the entire contents of which are incorporated by reference herein. Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. An LED driving apparatus for converting AC input power into required DC output power and supplying the DC output power to an LED load, comprising:
a switching element to be turned on and off;
a ripple current reducer connected in series with a cathode terminal of the LED load and configured to reduce current ripples passing through the LED load; and
a controller configured to turn on and off the switching element according to a feedback voltage at a connection point of the cathode terminal of the LED load and ripple current reducer, thereby controlling the DC output power to a predetermined value,
wherein the ripple current is a current variation caused by a voltage variation due to a pulsating current of one direction as the rectified AC input power.

2. The LED driving apparatus of claim 1, wherein the ripple current reducer includes a reactor.

3. The LED driving apparatus of claim 1, wherein the controller controls ON/OFF of the switching element so that a current passing through the LED load is equal to a first reference value.

4. The LED driving apparatus of claim 1, wherein the ripple current reducer is a feedback-controlled constant current source that variably controls an impedance of the switching element.

5. The LED driving apparatus of claim 4, wherein the feedback-controlled constant current source continuously and variably controls the impedance so that a current passing through the LED load approaches a second reference value.

6. The LED driving apparatus of claim 5, wherein a response speed of the feedback-controlled constant current source is faster than that of the controller.

7. The LED driving apparatus of claim 4, wherein a response frequency of the controller is equal to or lower than that of the AC input power.

8. An LED lighting apparatus comprising the LED driving apparatus of claim 1.

* * * * *